United States Patent
Hofer

(10) Patent No.: US 9,990,917 B2
(45) Date of Patent: Jun. 5, 2018

(54) METHOD AND SYSTEM OF RANDOM ACCESS COMPRESSION OF TRANSDUCER DATA FOR AUTOMATIC SPEECH RECOGNITION DECODING

(71) Applicant: INTEL CORPORATION, Santa Clara, CA (US)

(72) Inventor: Joachim Hofer, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/685,572

(22) Filed: Apr. 13, 2015

(65) Prior Publication Data

US 2016/0300566 A1    Oct. 13, 2016

(51) Int. Cl.
   G10L 15/00    (2013.01)
   G10L 15/02    (2006.01)
   G10L 15/08    (2006.01)

(52) U.S. Cl.
   CPC .................................. G10L 15/08 (2013.01)

(58) Field of Classification Search
   CPC ......... G10L 15/08; G10L 15/22; G10L 15/24; H03M 7/30; H03M 7/40; H03M 7/3053; H04N 19/124; H04N 19/129; H04N 19/13; H04N 19/132; H04N 19/169; H04N 19/30
   USPC ....... 704/231, 267, 211, 258, 268, 503, 200, 704/229, E21.017
   See application file for complete search history.

(56) References Cited

U.S. PATENT DOCUMENTS

| 6,484,137 | B1 * | 11/2002 | Taniguchi | ............... G10L 21/04 |
| | | | | 704/211 |
| 8,412,521 | B2 | 4/2013 | Mathias et al. | |
| 2002/0123882 | A1 | 9/2002 | Mohammed | |
| 2009/0281425 | A1 * | 11/2009 | Sasahara | ............... H04N 19/124 |
| | | | | 600/443 |
| 2011/0235928 | A1 * | 9/2011 | Strom | ................. H04N 19/176 |
| | | | | 382/233 |

FOREIGN PATENT DOCUMENTS

| CN | 103984315 | 8/2014 |
| TW | 201430832 | 8/2014 |
| WO | 2014117555 | 8/2014 |

OTHER PUBLICATIONS

International Search Report & Written Opinion for International Patent Application No. PCT/US2016/021483, dated Jul. 11, 2016.
Caseiro, Diamantino , "WFST Compression for Automatic Speech Recognition", 11th Annual Conference of the International Speech Communication Association (Interspeech 2010), pp. 1493-1496, Sep. 26-30, 2010.
Lei, et al., "Accurate and Compact Large Vocabulary Speech Recognition on Mobile Devices", Interspeech 2013, Aug. 25-29, 2013, Lyon, France, pp. 662-665.

(Continued)

*Primary Examiner* — Chan S Park
*Assistant Examiner* — Stephen M Brinich
(74) *Attorney, Agent, or Firm* — Green, Howard & Mughal LLP.

(57) ABSTRACT

A system, article, and method of random access compression of transducer data for automatic speech recognition decoding.

25 Claims, 8 Drawing Sheets

(56) References Cited

OTHER PUBLICATIONS

Lei, Xin et al., "Accurate and Compact Large Vocabulary Speech Recognition on Mobile Devices", 14th Annual Conference of the International Speech Communication Association (Interspeech 2013), pp. 662-665, Aug. 25-29, 2013.
Pino, Juan et al., "Simple and Efficient Model Filtering in Statistical Machine Translation", The Prague Bulletin of Mathematical Linguistics, vol. 98, pp. 5-24, Oct. 2012.
Price, Michael et al., "A 6mW, 5,000-Word Real-Time Speech Recognizer Using WFST Models", IEEE Journal of Solid-State Circuits, vol. 50, No. 1, pp. 102-112, Jan. 2015.
Office Action and Search Report for Taiwan Patent Application No. 105105442, dated Jan. 12, 2017.
International Preliminary Report on Patentability for International Patent Application No. PCT/US2016/021483, dated Oct. 26, 2017.
Notice of Allowance for Taiwan Patent Application No. 105105442 dated Sep. 18, 2017.

\* cited by examiner

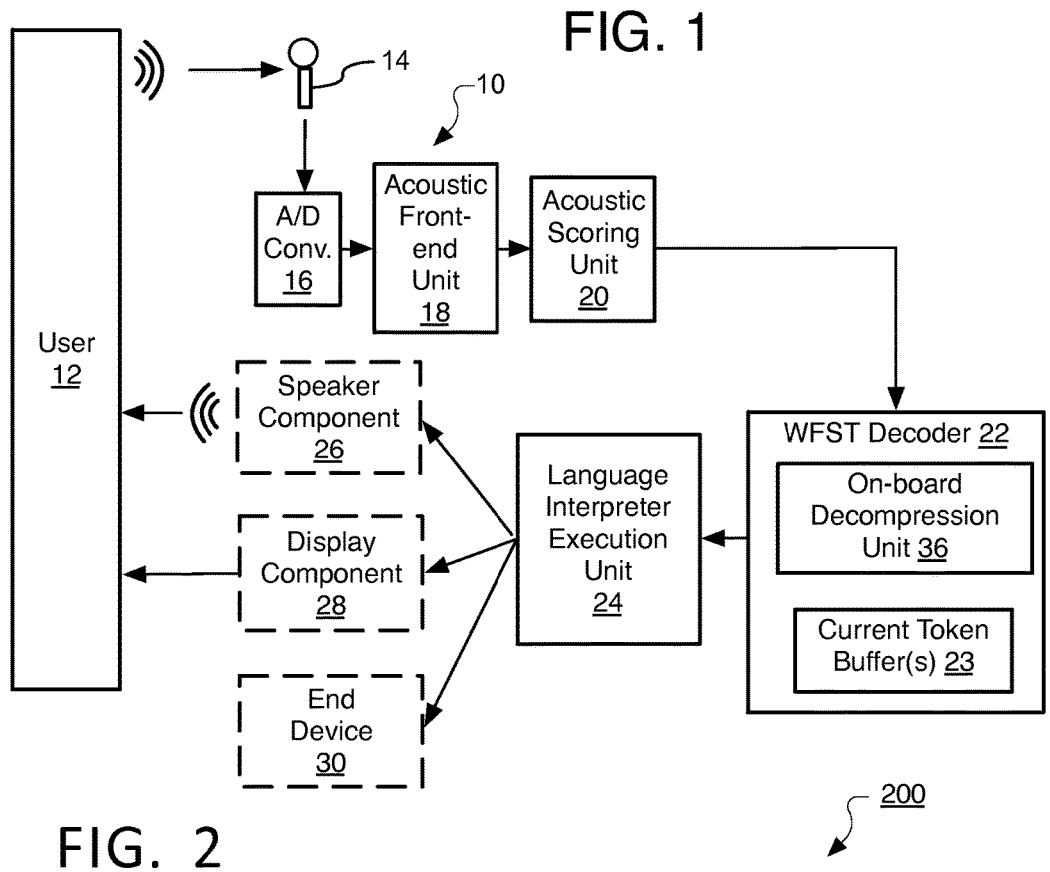

DETERMINE A LOCATION OF A COMPRESSED BLOCK IN AN ARRAY OF COMPRESSED BLOCKS OF TRANSDUCER-RELATED DATA 202

DETERMINE THE COMPRESSION RATE OF INDIVIDUAL COMPRESSED ENTRIES IN THE LOCATED COMPRESSED BLOCK 204

DETERMINE A KEY VALUE TO BE APPLIED TO INDIVIDUAL COMPRESSED ENTRIES OF THE LOCATED COMPRESSED BLOCK TO OBTAIN THE UNCOMPRESSED VALUE OF THE ENTRY 206

READ A COMPRESSED ENTRY FROM THE COMPRESSED BLOCK 208

DECOMPRESS THE COMPRESSED ENTRY BY APPLYING THE KEY VALUE TO THE COMPRESSED ENTRY 210

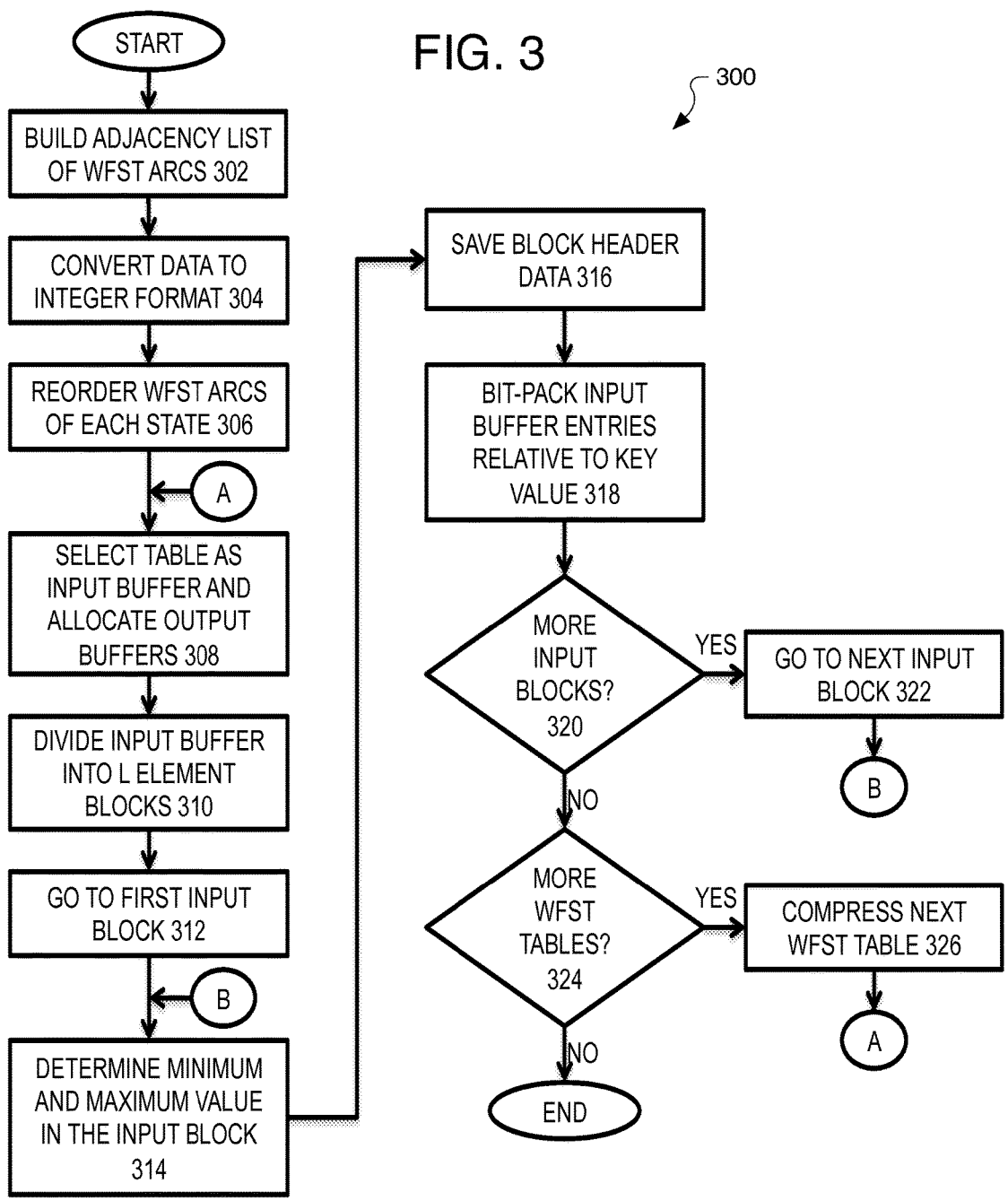

| ID | STATE'S FIRST ARC |
|---|---|
| 0 | 0 |
| 1 | 2 |
| 2 | 4 |
| END | 5 |

| ID | ARC LABEL |
|---|---|
| 0 | B |
| 1 | H |
| 2 | L |
| 3 | F |
| 4 | S |

| ID | ARC WEIGHT |
|---|---|
| 0 | 2.3 |
| 1 | 0.7 |
| 2 | 2.1 |
| 3 | 1.3 |
| 4 | 2.7 |

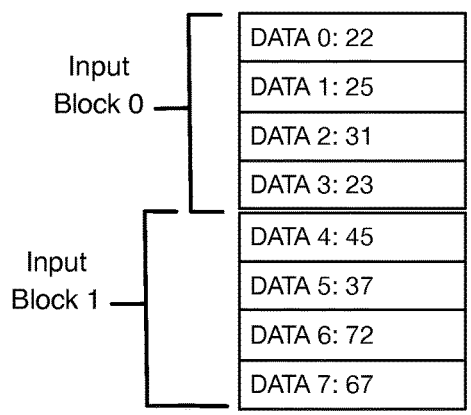
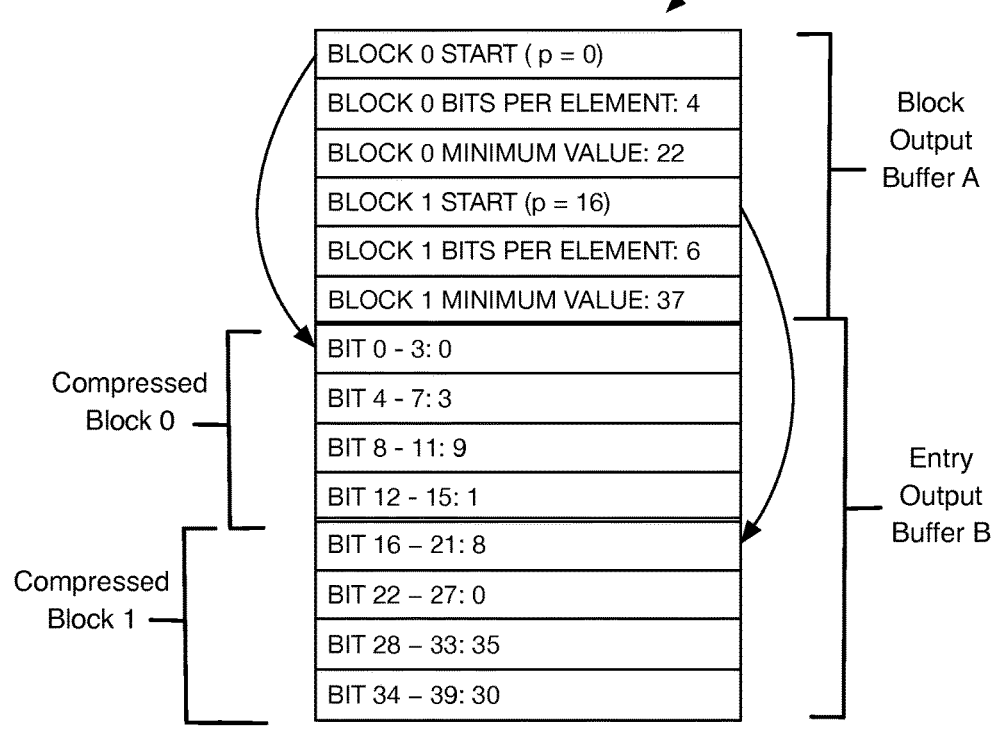

METHOD AND SYSTEM OF RANDOM ACCESS COMPRESSION OF TRANSDUCER DATA FOR AUTOMATIC SPEECH RECOGNITION DECODING

BACKGROUND

Speech recognition systems, or automatic speech recognizers, have become increasingly important as more and more computer-based devices use speech recognition to receive commands from a user in order to perform some action as well as to convert speech into text for dictation applications or even hold conversations with a user where information is exchanged in one or both directions. Such systems may be speaker-dependent, where the system is trained by having the user repeat words, or speaker-independent where anyone may provide immediately recognized words. Some systems also may be configured to understand a fixed set of single word commands or short phrases, such as for operating a mobile phone that understands the terms "call" or "answer", or an exercise wrist-band that understands the word "start" to start a timer for example. Other systems may have an extensive vocabulary such as for voice activated search engines.

Thus, automatic speech recognition (ASR) is desirable for wearables, smartphones, and other small devices. Due to the computational complexity of ASR, however, many small devices with ASR systems, and especially those with large vocabularies, are server based such that the computations are performed remotely from the device which can result in a significant delay and/or significant battery usage due to communication via WI-FI or other wireless communication methods. Other ASR systems have on-board computation ability. In these cases, small audio devices such as wearables or smartphones often have very limited temporary memory capacity to hold the vocabularies used by a decoding transducer such as a weighted finite state transducer (WFST) by one example. Specifically, ASR on small devices is often restricted to a limited vocabulary as the memory capacity is too small to hold the WFSTs necessary for large vocabulary speech recognition.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram showing an automatic speech recognition system;

FIG. 2 is a flow chart for a process of random access decompression of transducer data during decoding of a speech recognition process;

FIG. 3 is a detailed flow chart of compression of transducer data for online decompression during speech recognition;

FIG. 9 is an adjacency list of non-compressed transducer data; and

FIG. 10 is an example list of compressed transducer data from the list of FIG. 9;

DETAILED DESCRIPTION

Figures 4, 5, 6, 7:
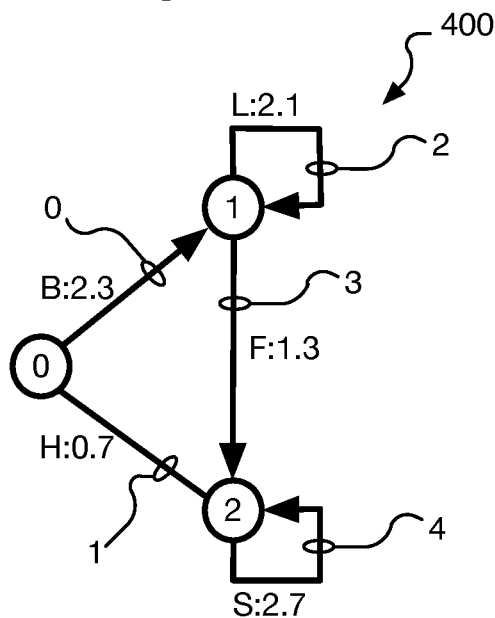
FIG. 4 is a diagram showing the topology of a simplified transducer for speech recognition decoding.
FIG. 5 is an example structure adjacency list to exemplify state-arc correspondence.
FIG. 6 is an example adjacency list of non-compressed arc labels listed by arc identification number of a transducer.
FIG. 7 is an example adjacency list of non-compressed arc weights listed by arc identification number of a transducer.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, mobile devices such as smartphones, wearable devices such as smartwatches-, smart glasses, and exercise wrist bands, video game panels or consoles, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of random access compression of transducer data for automatic speech recognition decoding.

Automatic speech recognition is an important human machine interface for devices with small form factors that do not incorporate keyboards. In such devices, memory sizes are usually limited. Conventional speech recognition uses weighted finite state transducers (WFSTs) for decoding to transform phoneme onto words or hypothetical sentences. The WFST uses a significant amount of RAM and/or ROM, which results in a limitation on the number of recognizable words on those devices. Thus, it is desirable to minimize the memory resources used by WFSTs.

Some conventional compression techniques disclose a succinct graph representation for a subset of WFSTs based on n-gram language models (see "Accurate and Compact Large Vocabulary Speech Recognition on Mobile Devices", Lei et al., Interspeech, 2013). This compression and memory technique uses tree structures referred to as level-order unary degree sequence (LOUDS). Using these tree structures, however, limits access to a breadth-first implementation. If data is to be accessed in a different manner, additional indices have to be built that support the desired navigation. There is also a significant rise in computational overhead to achieve traversal through the compressed tree compared to using uncompressed data structures. Moreover, this conventional approach uses 16 bit labels, allowing a maximum of 65000 words in the recognition vocabulary. Also, this approach cannot be used for lexicon (L), context-dependency lexicon (CL/HCL), or statically composed (HCLG) WFSTs, nor can it be used if grammars are used instead of statistical language models in contrast to the present methods.

To resolve these issues, the present system and method described herein uses a compression technique that is much more flexible and allows random access of single elements of the WFST thereby allowing speech recognition algorithms to run directly on the compressed WFST. For wearables, by one example described below, the present method reduces the memory requirements of the WFSTs by about 30% for small vocabularies, and by about 38% for a large vocabulary smart phone application. Importantly, it is possible to compress any type of WFST (including grammar based WFSTs and lexicon (L/CL/HCL) WFSTs), or parts of the WFSTs, to get a better compromise between memory consumption and computational overhead. None of the elements are restricted to 16 bits, permitting a vocabulary up to 4 billion words.

In the present compression technique, WFSTs are stored using adjacency lists. More specifically, all arcs in the WFST are stored in a structure of arrays. The individual attributes (or parameter types) of the list (source state, destination state, input label, output label, and/or weight) are stored in separate integer arrays. In one form, the arrays are grouped by the input state of the arc, which allows use of an index to the first arc of each state rather than storing the source state of each arc explicitly. Each of the lists is split up into blocks, and by one form, blocks of equal size. For each block, a key value such as the minimum value is stored as well as the deviation from the minimum value for each entry of the block. This deviation is stored with the minimum amount of bits necessary for each block. During run time, it is possible to randomly access individual elements of the WFST without de-compressing entire blocks of data. At first, the corresponding block is determined with a single memory lookup, then the minimum value of the block, the number of encoded bits and the encoded deviation is determined resulting in a total of 4 memory lookups per requested element. In one form, some of those values (e.g. the minimum value and the number of encoded bits) are stored in consecutive memory locations. In this case, those values may be read with a single memory lookup, which results in even less required lookups per requested element.

Referring now to FIG. 1, an automatic speech recognition system 10 may be a speech enabled human machine interface (HMI) that records or receives recorded audio, processes acoustic data, and then outputs speech or speech related data to a user or other system. While system 10 may be, or have, any device that processes audio, speech enabled HMIs are especially suitable for devices where other forms of user input (keyboard, mouse, touch, and so forth) is either inconvenient (such as on a smartphone) or are not possible due to size restrictions (e.g. on a wearable such as a smartwatch, smart glasses, or exercise wrist-band). On such devices, memory capacity may be very limited making highly efficient speech recognition implementations necessary. Here, the ASR system 10 may have an audio capture or receiving device 14, such as a microphone for example, to receive sound waves from a user 12, and that converts the waves into a raw electrical acoustical signal that may be recorded in a memory. The system 10 may have an analog/digital (A/D) converter 16 to provide a digital acoustic signal to an acoustic front-end unit 18. The acoustic front-end unit 18 may perform pre-processing which may include noise cancelling, pre-emphasis filtration to flatten the signal, and/or voice activation detection (VAD) to identify the endpoints of utterances as well as linear prediction, mel-cepstrum, and/or additives such as energy measures, and delta and acceleration coefficients, and other processing operations such as weight functions, feature vector stacking and transformations, dimensionality reduction and normalization. The front-end unit 18 also may divide the acoustic signal into frames, by 10 ms frames by one example, and extracts acoustic features or feature vectors from the acoustic signal using Fourier transforms and so forth to identify phonemes provided in the signal. An acoustic scoring unit 20 then determines a probability score for the context dependent phonemes that are to be identified.

A transducer that may be a weighted finite state transducer (WFST) unit or decoder 22 uses the acoustic scores to identify utterance hypotheses and compute their scores. The WFST decoder 22 uses calculations that may be represented as a network (or graph) that is referred to as the WFST. The WFST has arcs (or edges) and states (or nodes) interconnected by the arcs. The arcs are arrows that extend from state-to-state on the WFST and show a direction of flow or propagation. Additionally, the WFST decoder 22 may dynamically create a word or word sequence hypothesis, which may be in the form of a word lattice that provides confidence measures, and in some cases, multiple hypotheses that provide alternative results. The WFST decoder 22 uses a WFST that may be determinized, minimized, weight or label pushed, or otherwise transformed (e.g. by sorting the arcs by weight, input or output symbol) in any order before being used for decoding.

The WFST may be a deterministic or a non-deterministic finite state transducer that may contain epsilon arcs. The WFST may have one or more initial states, and may be statically or dynamically composed from a lexicon WFST (L), and a language model or a grammar WFST (G). Alternatively, the WFST may have lexicon WFST (L) which may be implemented as a tree without an additional grammar or language model, or the WFST may be statically or dynamically composed with a context sensitivity WFST (C), or with a Hidden Markov Model (HMM) WFST (H) that may have HMM transitions, HMM state IDs, Gaussian Mixture Model (GMM) densities, or Deep Neural Network (DNN) output state IDs as input symbols.

It will be appreciated that the input labels of an arc may be context dependent phoneme, HMM, GMM density, DNN state or other acoustic ID, depending on the type of WFST used for decoding. The inputs are used to determine the acoustic score applied to a token that is propagated along the arc. The output labels of the arcs represent spoken words or other sentence fragments. If an output label of an arc is not epsilon (empty), and a token is passed along said arc, then the corresponding word or sentence fragment is appended to the utterance hypothesis of the token. Thus, for example, if the output of an arc is the word "I" meaning that if a token is passed along the arc, then the underlying utterance hypothesis contains the word "I".

In addition to the features mentioned above, the WFST decoder 22 also may have an on-board decompression unit 36 that accesses the compressed WFST as transducer entries are needed while the computations of the decoder propagate a token through the transducer. By the present methods as explained below, some or all WFSTs are stored in a RAM for example, and by using an efficient compression technique. The compression is arranged in a way to allow accessing the information of the arcs needed to propagate tokens through the transducer in a random order. This is accomplished by decompressing the requested entry without the need to decompress entire blocks of unwanted data along with the desired entry.

It also will be understood that for any of the compression implementations described herein, the WFST decoder 22 may be considered the unit to perform or manage the tasks related to compressing the WFST or other transducer data on-board and including the population of the input buffer adjacency lists and forming the compressed data of the output buffers. Alternatively, it will be appreciated that these compression tasks may be performed by other compression units either on the ASR device 10 or off of the ASR device 10.

After propagation, the WFST may contain one or more final states that may have individual weights. The WFST decoder 22 uses known specific rules, construction, operation, and properties for single-best or n-best speech decoding, and the details of these that are not relevant here are not explained further in order to provide a clear description of the arrangement of the new features described herein. The WFST based speech decoder used here may be one similar to that as described in "Juicer: A Weighted Finite-State Transducer Speech Decoder" (Moore et al., $3^{rd}$ Joint Workshop on Multimodal Interaction and Related Machine Learning Algorithms MLMI'06).

A hypothetical word sequence or word lattice may be formed by the WFST decoder by using the acoustic scores and token passing algorithms to form utterance hypotheses. A single token represents one hypothesis of a spoken utterance and represents the words that were spoken according to that hypothesis. During decoding, several tokens are placed in the states of the WFST, each of them representing a different possible utterance that may have been spoken up to that point in time. At the beginning of decoding, a single token is placed in the start state of the WFST. During discrete points in time (so called frames), each token is transmitted along, or propagates along, the arcs of the WFST. If a WFST state has more than one outgoing arc, the token is duplicated, creating one token for each destination state. If the token is passed along an arc in the WFST that has a non-epsilon output symbol (i.e. the output is not empty, so that there is a word hypothesis attached to the arc), the output symbol may be used to form a word sequence hypothesis or word lattice. In a single-best decoding environment, it is sufficient to only consider the best token in each state of the WFST. If more than one token is propagated into the same state, recombination occurs where all but one of those tokens are removed from the active search space so that several different utterance hypotheses are recombined into a single one. The output symbols may be collected, depending on the type of WFST, during or after the token propagation to form an utterance hypothesis or a word lattice.

The output hypothesis or word lattice is made available to a language interpreter and execution unit (or interpretation engine) 24 to determine the user intent. This intent determination or spoken utterance classification may be based on decision trees, form filling algorithms or statistical classification (e.g. using support vector machines (SVMs) or deep neural networks (DNNs)).

Once the user intent is determined for an utterance, the interpretation engine 24 also may output a response or initiate an action. The response may be in audio form through a speaker component 26, or in visual form as text on a display component 28 for example. Otherwise, an action may be initiated to control another end device 30 (whether or not considered as part of, or within, the same device as the speech recognition system 10). For example, a user may state "call home" to activate a phone call on a telephonic device, the user may start a vehicle by stating words into a vehicle fob, or a voice mode on a smartphone or smartwatch may initiate performance of certain tasks on the smartphone such as a keyword search on a search engine. The end device 30 may simply be software instead of a physical device or hardware or any combination thereof, and is not particularly limited to any particular device except to have the ability to understand a command or request resulting from a speech recognition determination and to perform or initiate an action in light of that command or request.

Referring to FIG. 2, an example process 200 for a computer-implemented method of random access compression of transducer data for automatic speech recognition decoding is provided. In the illustrated implementation, process 200 may include one or more operations, functions or actions as illustrated by one or more of operations 202 and 210. By way of non-limiting example, process 200 may be described herein with reference to example speech recognition devices described herein with any of FIGS. 1 and 4-7, and 9-12, and where relevant.

Process 200 may include "determine a location of a compressed block in an array of compressed blocks of transducer-related data" 202. In particular, when an ASR device requests data needed for decoding from a compressed transducer, the location of the compressed block that contains the required information is determined by a table lookup. That table contains the start locations of all compressed blocks for a given transducer.

Process 200 also may include "determine the compression rate of individual compressed entries in the located compressed block" 204, as well as "determine a key value to be applied to individual compressed entries of the located compressed block to obtain the uncompressed value of the entry" 206. Thus, the compression rate, i.e. the number of bits per compressed entry and the key value of the block are determined by using a table lookup. The key value is a number to be added or otherwise used in a mathematical formula separately with individual compressed values in the block to obtain the individual uncompressed values. By one example, the individual compressed entries are numerical differences each being a difference between the key value and a transducer entry associated with one of the numerical differences.

Process 200 may include "read a compressed entry from the compressed block" 208, and "decompress the compressed entry by applying the key value to the compressed entry" 210. In particular, the bit location of the compressed entry inside the compressed block is determined by multiplying the index of the entry by the number of bits per compressed entry inside the block. The compressed bits are then decompressed, by one example by using bit shift and bit mask operations, and by adding or otherwise applying the block's key value to the compressed entry.

During speech recognition, process 200 may be used individual times or every time information from a WFST is needed to continue operation. In particular, during token passing of WFST decoding, whenever data from the WFST (like arc destination states, transition weights, input or output symbols) are needed to proceed with the token passing, process 200 may be used to receive the required information from the relevant table of the compressed WFST.

Referring to FIG. 3, an example computer-implemented method of random access compression of transducer data for automatic speech recognition decoding is provided. In the illustrated implementation, process 300 may include one or more operations, functions or actions as illustrated by one or more of operations 302 to 326 numbered evenly. By way of non-limiting example, process 300 may be described herein with reference to example speech recognition devices described herein with any of FIGS. 1, 4-7, and 9-12, and where relevant.

Process 300 may include "build adjacency list of WFST arcs" 302. If the WFST is not stored as an adjacency list after generation, it is converted to that format. For each element of the arc, an individual table 600 or 700 may be created as shown in FIGS. 6-7. In particular, one table for arc destination and/or source states, one for arc transition weights, one for input labels, and one for output labels may be created. Arc source states either may be stored in a separate table or they may be implicitly stored by sorting arcs according to their arc source states. In the latter case, an additional table holding the index for the first arc of each state is stored in order to be able to determine which arc corresponds to which source state in the WFST.

The individual elements of arcs are usually similar across several arcs, but elements of different types usually differ significantly. As an example, the output labels of WFST arcs are very often "epsilon" or 0, and the transition weights of arcs originating from one source state are often similar, but there is little similarity between output labels and arc weights. For that reason, the packing operation done at a later stage of WFST compression improves if those values are stored independently of each other. In order to achieve this, each element of an arc may be stored in its own table as described above for operation 302.

Process 300 may include "convert data to integer format" 304. If the data that represents the WFST is not already in integer format, e.g. if it contains floating point weights or textual label symbols, this data is converted to integer. In case of floating point values, the values are either converted to fixed point or individual values are stored in a lookup table, for example by means of vector quantization. In case of textual input or output labels, label symbol tables are used to convert the data to integral indices. After operation 304, all adjacency list tables representing the WFST only contain integral values.

The process 300 then may include "reorder WFST arcs of each state" 306. In order to improve the compression rate, the similarity of adjacent entries in the adjacency list tables, the arcs corresponding to one source state may be reordered. In one example, the arcs are sorted by their transition weights in ascending or descending order. This operation maximizes the similarity of adjacent entries which improves the packing operation done at a later stage of WFST compression.

Referring to FIGS. 4-7, to exemplify the adjacency arrays (or tables or lists), an example, simplified graph or transducer 400 is provided with an example non-compressed memory layout (lists 500, 600 and 700). The transducer 400 has states 0, 1, and 2, where arc 0 leads from state 0 (the source state) to state 1 (the destination state) has a label B and weight 2.3. Arc 1 extends from state 0 to state 2 with a label H and weight 0.7, while arc 2 is a self-loop starting and ending at state 1 with a label L and a weight 2.1 to contribute the probability of a prolonged phoneme. Arc 3 extends from state 1 to state 2 with a label F and weight 1.3, while arc 4 is another self-loop at state 2 with label S and weight 2.7. The arcs in the example WFST are sorted by input state first, and then within one input state by transition weight in descending order.

Referring to FIG. 5, structure adjacency list 500 is arranged to indicate the structure of transducer 400. Each state is listed in order as an ID number for the list. The IDs are not actually stored but represented by memory locations instead. Each state (or ID) has its first arc number listed on the list 500 where the state is the source of the listed arc in this example, and first refers to the numbering on the transducer. Thus, the first arc for state 0 is arc 0, and the first outgoing arc for state 1 is arc 2, and so forth. The list 500 also lists the last arc of the last state plus one (here 5) to indicate the end of the transducer. With this arrangement, the last arcs of each state do not need to be listed in the structure adjacency list.

Referring to FIGS. 6-7, then to store the non-compressed transducer entries, adjacency lists 600 and 700 are formed. As mentioned, each list (or array or table) may be provided for a particular parameter type. Thus, list 600 is provided for input or output labels, and list 700 may be provided for weights. The list may be ordered by arc number as the ID for the transducer entry. This arc number then indicates the position of the transducer entry on the transducer and becomes the index value i that is used for decompression as described below. Also as mentioned, while adjacency list 600 recites the actual phoneme, it will be understood that a numerical code may be provided instead that is assigned to all or parts of the ASR vocabulary for use by the transducer. Similarly, list 700 may recite integer codes for the fractional weight values when desired. In order to obtain the label of the first arc of state "1" for example, one would first look up its ID in "State's first arc" which is 2. Then one would receive the second element from the "Arc label" table at index 2, i.e., "L" as defined below.

Once the transducer entry adjacency lists are established, and may be considered to form input buffers, the lists may be compressed for use by an ASR device. The compression algorithms pack the individual tables individually. That way, it is also possible to just compress some of the tables in order to get a better compromise between computational complexity and compression rate. By one form, the transducer compression is performed as an engineering step during language resource generation before being transferred to the target device that performs recognition. It is understood that speech recognition WFST usually are static resources that are not adapted to the user or the recognition environment. As such, it is sufficient to store the compressed transducer on the end-user device. In one form, additional or alternative WFSTs that are adapted to the user, the device or the application, are created and compressed on the end-user device while recognition is not active.

Referring to FIGS. 9-10, an adjacency list table 900 of non-compressed transducer entries and the corresponding compressed array (or list or table) 1000 is provided to assist with explanation of processes 300 and 800 as described below. Array 1000 has a block output buffer A and an entry output buffer B for a certain parameter. To begin the compression operations then, process 300 may include "select table as input buffer and allocate output buffers" 308. As adjacency tables of the WFST are compressed individually, one table is selected in this operation and used as input buffer in the following description. Two output buffers that contain compressed data are created, an output buffer A that contains block header information, and an output buffer B which contains the compressed entries. The output buffers initially contain no information albeit shown to be already populated on list 1000. Block output buffer A will hold the block level data such as a bit-wise block pointer value p (shown in parenthesis) and which also indicates the start of a block. The block numbering starts with block b=0, but the buffer may not actually store the block number. The block buffer A also stores a key transducer value (or just key value) for a block (which may be the minimum value), and the bit-length (or compression rate) of the data in each block. By one approach, this data is saved in a block-by-block format in order of block number (or pointer p) as shown on FIG. 10. The entry output buffer B will hold the compressed entry values that relate to each transducer entry in the uncompressed adjacency list, and that can be used to compute the transducer entry as explained below.

Process 300 may include "divide input buffer into L element blocks" 312. Thus, a single table 900 is compressed by first fragmenting it into blocks of equal length or in other words the same number of entries or elements L in each block, except possibly the last block when such an even count of transducer entries is not provided. The number L of transducer entries associated with a block, by one example is 128 entries, but it is also possible to use different block lengths for different tables. A block is formed of consecutive (on the transducer and by index number) transducer entries of the same parameter type. As shown on FIG. 9 for the present example, the input buffer (or adjacency list table) 900 is divided into blocks of L=4 entries, where the transducer entries are either label codes, first arc indices, destination state indices or weight values (or weight related codes). Elements or transducer entries 0 to 3 are in a first input block 0, and entries 4 to 7 are in a second input block 1 for this example.

Process 300 may include "go to first input block" 312, and particularly to compress the transducer entries in the first block on the input buffer (or adjacency list table) 900.

Process 300 may include "determine minimum and maximum value in the input block" 314. This is performed both to obtain the key transducer entry for the block from the adjacency list and that will be used as a reference value for all compressed entries in the block, and to determine the bit-length needed for each entry in the block. In one example, the key transducer entry is the minimum transducer entry in the input block, but many other alternatives are contemplated. It could be the maximum value, the average of the maximum and minimum value, the arithmetic mean or the median of all values in the block or another value which in one form is chosen independently of the input block. The compression technique here saves a key transducer entry for each block as explained below, and the key transducer entry may be the only full transducer entry value that is saved for each block. In one form, the key transducer value is equal for all blocks and thus not stored explicitly.

Process 300 may include "save block header data" 316. The block header values are saved in the output buffer A. p is the bit-wise pointer indicating the bit location of the start of the block in output buffer B as mentioned above, and for which is 0 for the first block in the present example (and stored as 0 but indicated as Block 0 start on array 1000). Performing the operations for process 300, the start of block 1 will correspond to p=16 as shown on block buffer A of compressed array 1000. By one form, only the p value is actually saved and will indicate the block number by the position of the p value on block buffer A of array 1000. In one form, p is not stored in bit-wise form, but stored as a Byte or Word position. In that case, the starts of compressed blocks are aligned to Byte or Word boundaries. The key transducer value that was calculated in operation 316 is stored. The number of bits needed to store each entry depends on the minimum value m and maximum value M of the uncompressed entries and the key transducer values. In case that the minimum is used as key transducer value, an integer value that is at least $\log_2(M-m)$ is the number of required bits. This sets the bit-length for the transducer entry related values that will be stored in the block. By one form, this is the bit-length for all of such values stored in a single block, and may be different from block to block. Thus, once the header values are calculated, the values may be stored in consecutive fields in the appropriate block of output buffer A. By the present example then, p=0, m=22 (from the first input block on list 900), and the number of bits per element is 4, and these values are stored for block 0 as shown on array 1000.

Process 300 may include "Bit-pack input buffer entries relative to key value" 318. All values in the input buffer are compressed by using as many bits per value as is stored in the block's header. In order not to lose information, the key transducer value is first subtracted from each input value, the resulting integer is stored using the specified number of bits. The remaining bits that are left in a Byte or a Word are not padded with zeros, but the values are rather bit-packed. The compressed values are stored in the output buffer B. The minimum size of output buffer B for the block is thus the number of values times the number of bits as stored in the header. The output buffer may be padded with zeros in order to align with a Byte or a Word boundary.

It will be understood that other alternatives than a numerical difference value may be used and stored in a compressed block such as using a lookup table based on the key value.

Process 300 then may include a test "more input blocks?" 320. If not, the corresponding WFST table was completely compressed and the next table may be compressed next. If more input blocks are present on the adjacency list, process 300 may include "go to next input block" 322, and in the present example, would be compressed block 1 starting with data 4: 45 on list 900. The process then repeats to store the block output buffer data (p=16, 6 bits per numerical difference, minimum transducer value=37), and then stores the numerical difference related to each transducer entry of the input block, and element by element into the compressed block of the entry output buffer B. It will be understood that as the process 300 loops in this manner, the most recently established p value is stored as the starting bit location for the next block. Thus, for block 1, p=16; for block 2, p=40, and so forth for the present example. The numbering of the p start location for each block will not always be formed at even intervals since it depends, at least in part, on the bit-length for each numerical difference in the blocks, which can be different from block to block as explained herein.

Process 300 then may include a test "more WFST tables?" which determines whether there are more uncompressed WFST tables that shall be compressed. If not, the process ends as the WFST is completely compressed. If more adjacency list tables are to be compressed, process 300 may include "compress next WFST table", which results in a new table being selected as input buffer and later compressed. It will be understood that the process 300 loops in this manner until all adjacency list tables that are supposed to be compressed are compressed into output buffers.

When no more WFST tables exist, the compressing process is ended, and the compressed WFST data is stored in the respective output buffers. Those output buffers can then be combined into one binary language resource, possibly combining it with other WFSTs, symbol tables and/or acoustic models and other data. The language resource can then be used in conjunction with ASR software that is able to decompress the WFST during recognition as described below for process 800.

Figure 8:
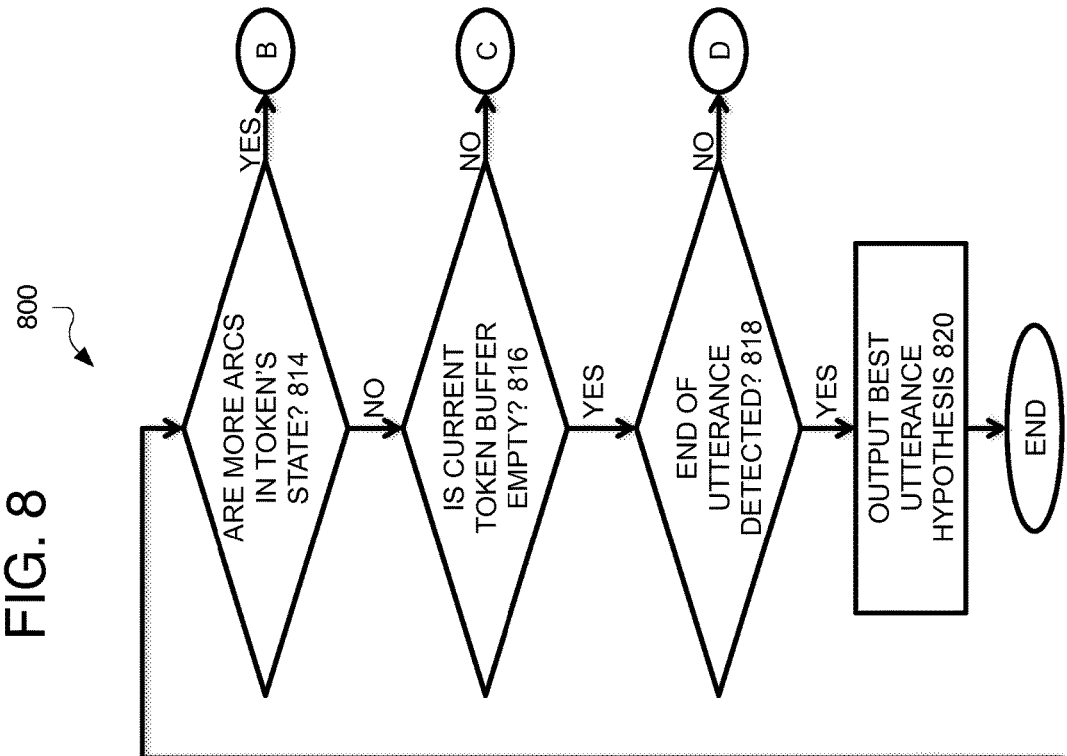
FIG. 8 is a flow chart to explain speech recognition using a WFST that is compressed with the method detailed in FIG. 3.

Referring to FIG. 8, to use a compressed WFST for speech recognition, a process 800 is part of an example computer-implemented method of speech recognition using random access transducer data decompression. In the illustrated implementation, process 800 may include one or more operations, functions or actions as illustrated by one or more of operations 802 to 820 numbered evenly. By way of non-limiting example, process 800 may be described herein with reference to example speech recognition devices described herein with any of FIGS. 1, 4-7 and 9-12, and where relevant.

Process 800 may include "obtain acoustic signal data" 802. As mentioned above, this may include the use of a sound or audio capture device, pre-processing of the acoustic signal, and feature extraction by a front-end unit, and acoustic scoring by an acoustic scoring unit. By one approach, the feature extraction and acoustic scoring occurs before the WFST decoding begins. By another example, the acoustic scoring may occur just in time. If scoring is done just in time, it may be done on demand, i.e. only scores that are needed during WFST decoding are computed.

Process 800 may include "put initial token in current token buffer" 804. In one form, the token will be placed in the initial state of the WFST in order to initialize decoding. A token buffer may hold the tokens for the frames to be analyzed. Thus, there may be multiple token buffers as one buffer for each frame. By one approach, this includes at least two token buffers including a current token buffer holding active tokens of the current frame, and a next token buffer holding the tokens of the next frame to be activated. In a different approach there may be only one token buffer which may be organized as a ring that holds both tokens for the current and the next frame. This buffer may include a marker that separates current tokens from future tokens. Tokens may refer to a single WFST for a static composition approach or to several WFTSs if dynamic composition is used.

Process 800 may include "calculate acoustic features for the next time frame" 806. Thus, one or more possible extracted features are determined that can be used for acoustic scoring. As described earlier, acoustic feature extraction may include acoustic pre-processing, voice activity detection, noise reduction, dimensionality reduction and other steps to improve speech recognition.

Process 800 may include "take next token from current token buffer" 808. This token is to be propagated through the WFST. As only the compressed WFST is present during decoding, before the destination states, weights, acoustic scores and so on can be applied, the data from individual or all outgoing arcs of the tokens state must be decompressed, which may be done iteratively in operation "decompress data of next WFST arc" 810.

In order to decompress data from the compressed adjacency lists, at first the relevant list is chosen. As an example, FIG. 10 may show arc weights which are needed to determine the score of a token after being propagated along the corresponding arc. Next, the block in which the data is saved has to be determined which depends on the number of elements per block. In FIG. 10, each block contains 4 values. If, for example, the weight of the seventh arc is needed for decoding, the second block, i.e. "Block 1" is chosen. The respective block header is then read, which may include the start location of the compressed data, the number of bits per element and the key value.

The index of the compressed element inside the block may be determined by a modulo operation of the requested entry index and the number of entries per block. If, for example, the seventh entry of the list in FIG. 10 is requested, this corresponds to the third element inside the second block, as seven modulo four equals three. The location of the first bit of the entry to decompress may then be determined by adding the block start, which was read from the header, to the entry index inside the block times the number of bits per entry inside the block. In the example of FIG. 10 the seventh entry starts at bit location 16+2*6=28. The value determined by the respective bits starting at that location may then be applied, or by one example added, to the key value of the block to get the requested uncompressed value. The third entry in the second block of FIG. 10 contains the value 35, which added to the block key value of 37 results in 72. As can be seen in FIG. 9, this is equal to the corresponding uncompressed value.

Process 800 may include "propagate token through arc using acoustic scores" 812. Using the decompressed arc data from operation 810 and acoustic scoring based on the acoustic features that were calculated in operation 806, the token is propagated along the WFST arc, and a new token with updated score and trace back entries may be placed in the token buffer of the next frame. For acoustic scoring, Gaussian Mixture Models (GMMs), Deep Neural Networks (DNNs) or other algorithms that transform feature vectors into scores may be used. The acoustic scores may either be computed on demand or they may have been precomputed at a previous stage of processing and read from a table during token processing.

Instead of propagating tokens through a single WFST with static composition, the approach may also be used in combination with several WFSTs and dynamic composition. In that case one, some or all of WFSTs may be compressed. During token propagation, data from all compressed WFSTs may be decompressed on the fly using the previously mentioned approach.

Process 800 may include a test "are more arcs in token's state?" 814, which checks whether more arcs are going out of the WFST state that the token is in which the token has to propagate along in the current frame. In that case, propagation is repeated by going to operation 810. It is understood that all outgoing arcs of the token's state are addressed iteratively in that manner. If no more arcs have to be processed, the next token in the current token buffer can be processed. This may be achieved by a test "is current token buffer empty" 816 which continues with operation 808 to access the next token if at least one more is present. If no more tokens are present, decoding has finished and the process may continue with a check whether speech recognition is finished.

Process 800 may include a test "end of utterance detected?" 818 which checks whether more frames have to be processed. The end of the utterance may be detected by means of voice activity detection (VAD), by a stability condition of the best current hypothesis or by any other way to determine whether the speaker has stopped speaking. If no end was detected, processing may be continued with the next acoustic frame 806. If the end of the utterance was detected, process 800 may include "output best utterance hypothesis" 820, which may be in the form of a first best hypothesis, n-best hypothesis or a lattice. This operation may terminate speech recognition and the output may be transmitted to a speech interpretation or an execution unit in order to react on the user's intent.

The WFST compression may be used for software ASR engines. It also may be used in a hardware accelerated WFST decoder where the decompression of values may be performed in specialized hardware. The test results of a software version is provided below.

As to test results with the methods described herein, a transducer such as a WFSTs are large graphs that usually take up a significant amount of memory provided by the platform. For large vocabulary recognition, statically composed WFSTs can have the size of several gigabytes, and with dynamic composition, the WFTSs still may need tens of megabytes. On platforms with small form factors, where speech recognition gives the largest benefit, memory resources are usually scarce. Thus, reducing the memory requirements of WFSTs allows the usage of larger recognition vocabularies or more complex grammars. A conventional state-of-the-art WFST decoding algorithm was used for tests with the compression methods disclosed herein, resulting in less memory requirements while still allowing random access. As explained above, individual states or arcs of the WFST can be accessed directly from the compressed WFST without having to decompress a whole block of data as is usually necessary for compressed data.

| Small vocabulary task (1000 words) Test: | | | | |
|---|---|---|---|---|
| Compression | CL WFST Size | G WFST size | Rel. size (smaller is better) | Rel. comp. overhead (smaller is better) |
| None (OpenFST) | 208 kB | 408 kB | 100% | 0% |
| Lei et al. publication compression methodology (*) | 208 kB | ~135 kB(*) | ~56%(*) | ~20%(*) |
| Our approach (G WFST only) | 208 kB | 108 kB | 51% | 7% |
| Our approach (G and CL WFSTs) | 74 kB | 108 kB | 30% | 26% |

| Large vocabulary task (200000 words): | | | | |
|---|---|---|---|---|
| Compression | CL WFST Size | G WFST size | Rel. size (smaller is better) | Rel. comp. overhead (smaller is better) |
| None (OpenFST) | 12 MB | 123 MB | 100% | 0% |
| Lei et al. publication compression methodology(*) | 12 MB | ~41 MB(*) | ~39%(*) | ~20%(*) |
| Our approach (G WFST only) | 12 MB | 46 MB | 43% | 1% |
| Our approach (G and CL WFSTs) | 5 MB | 46 MB | 38% | 3% |

(*) cited above. The numbers shown are not based on actual experiments but on relative improvement numbers presented in the paper. Actual numbers for Lei et al.'s approach may vary significantly.

It will be appreciated that processes 200, 300 and/or 800 may be provided by sample ASR systems 10 and/or 1100 to operate at least some implementations of the present disclosure. This includes operation of an acoustic front-end unit 1108, acoustic scoring unit 1110, WFST decoder 1112 with an on-board decompression unit 1111, and a language interpreter execution unit 1114, as well as others, in speech recognition processing system 1100 (FIG. 11) and similarly for system 10 (FIG. 1).

In addition, any one or more of the operations of FIGS. 2-3 AND 8 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
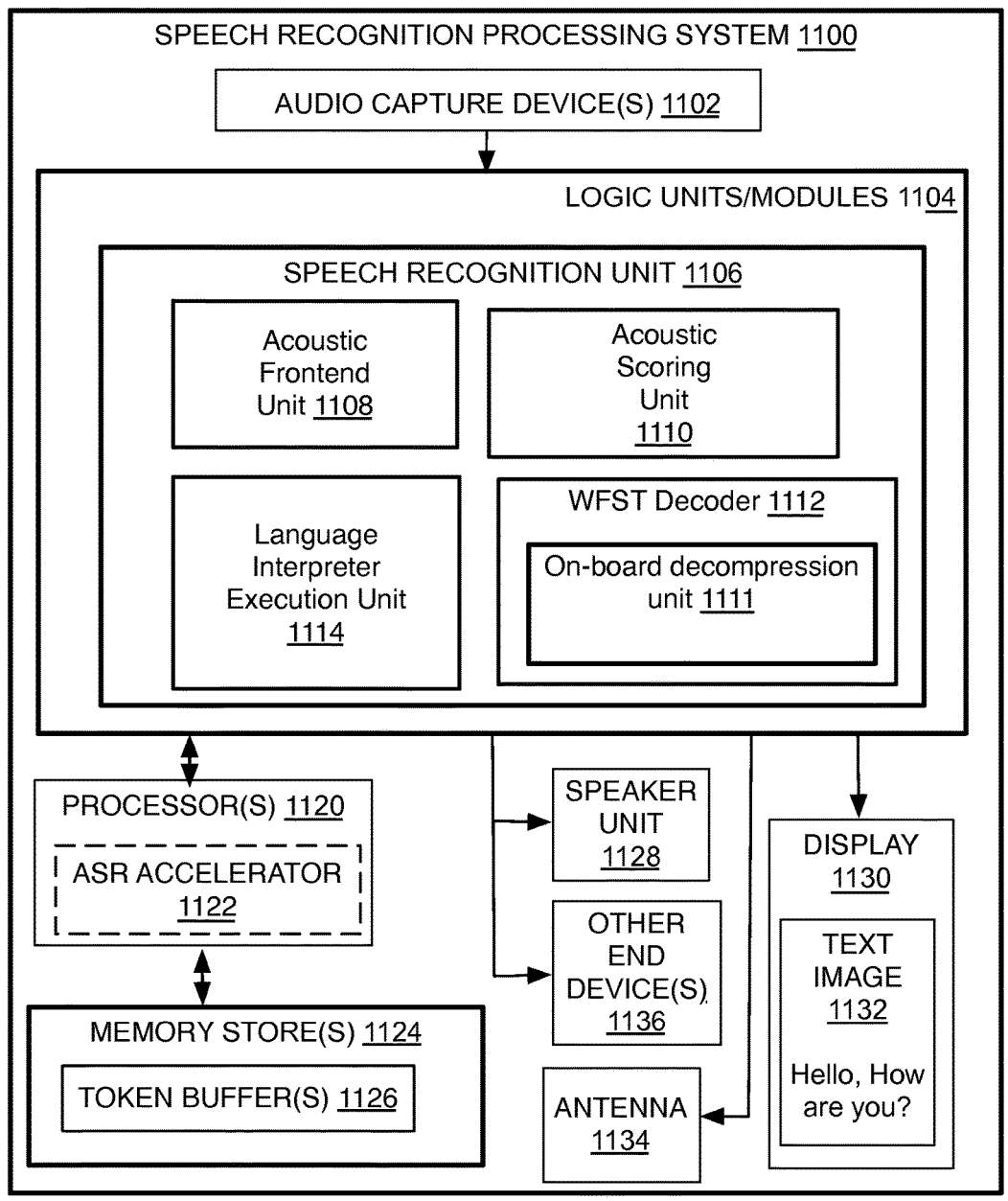
FIG. 11 is a diagram of an example system.

Referring to FIG. 11, an example speech recognition processing system 1100 is arranged in accordance with at least some implementations of the present disclosure. In various implementations, the example speech recognition processing system 1100 may have an audio capture device(s) 1102 to form or receive acoustical signal data. This can be implemented in various ways. Thus, in one form, the speech recognition processing system 1100 may be an audio capture device such as a microphone, and audio capture device 1102, in this case, may be the microphone hardware and sensor software, module, or component. In other examples, speech recognition processing system 1100 may have an audio capture device 1102 that includes or may be a microphone, and logic modules 1104 may communicate remotely with, or otherwise may be communicatively coupled to, the audio capture device 1102 for further processing of the acoustic data.

In either case, such technology may include a telephone, a smartphone, or wearable device such as smartwatch, smart glasses, and/or smart exercise wrist-band, a dictation machine, other sound recording machine, a mobile device or an on-board device, or any combination of these. The speech recognition or WFST decoder used herein enables ASR for the ecosystem on small-scale CPUs (wearables, smartphones) since the present systems and methods do not require connecting to the cloud to perform the token propagation as described herein. In datacenter ASR applications, this method would decrease the bit-cost of WFST decoding to be stored in temporary memory during decoding to allow either faster processing or larger vocabulary models for increased accuracy.

Thus, in one form, audio capture device 1102 may include audio capture hardware including one or more sensors as well as actuator controls. These controls may be part of a sensor module or component for operating the sensor. The sensor component may be part of the audio capture device 1102, or may be part of the logical modules 1104 or both. Such sensor component can be used to convert sound waves into an electrical acoustic signal. The audio capture device 1102 also may have an A/D converter, other filters, and so forth to provide a digital signal for speech recognition processing.

In the illustrated example, the logic modules 1104 may include an acoustic front-end unit 1108 that provides pre-processing as described with unit 18 (FIG. 1) and that identifies acoustic features, an acoustic score unit 1110 that provides acoustic scores for the acoustic features, a WFST decoder 1112 that uses one or more compressed transducers to provide a word sequence hypothesis, and a language interpreter execution unit 1114 that determines the user intent and reacts accordingly. The WFST decoder may have an on-board decompression unit 1111 that decompresses compressed arrays that may be stored on volatile and/or non-volatile memory on the device. The WFST decoder unit 1112 may be operated by, or even entirely or partially located at, processor(s) 1120, and which may include, or connect to, an accelerator 1122 to perform at least the WFST decoding. The logic modules may be communicatively coupled to the components of the audio capture device 1102 in order to receive raw acoustic data. The logic modules 1104 may or may not be considered to be part of the audio capture device.

The speech recognition processing system 1100 may have one or more processors 1120 which may include the accelerator 1122, which may be a dedicated accelerator, and one such as the Intel Atom, memory stores 1124 which may or may not hold the token buffers 1126 as well as word histories, phoneme, vocabulary and/or context databases, and so forth, at least one speaker unit 1128 to provide auditory responses to the input acoustic signals, one or more displays 1130 to provide images 1132 of text or other content as a visual response to the acoustic signals, other end device(s) 1136 to perform actions in response to the acoustic signal, and an optional antenna 1134. In one example implementation, the speech recognition system 1100 may have the display 1130, at least one processor 1120 communicatively coupled to the display, at least one memory 1124 communicatively coupled to the processor and having a token buffer 1126 by one example for storing the tokens as explained above. The antenna 1134 may be provided for transmission of relevant commands to other devices that may act upon the user input as well as to receive or send user specific information from/to a remote service. Otherwise, the results of the speech recognition process may be stored in memory 1124. As illustrated, any of these components may be capable of communication with one another and/or communication with portions of logic modules 1104 and/or audio capture device 1102. Thus, processors 1120 may be communicatively coupled to both the audio capture device 1102 and the logic modules 1104 for operating those components. By one approach, although speech recognition system 1100, as shown in FIG. 11, may include one particular set of blocks or actions associated with particular components or modules, these blocks or actions may be associated with different components or modules than the particular component or module illustrated here.

As another alternative, it will be understood that speech recognition system 1100, or the other systems described herein (such as system 10 or 1200), may be a server, or may be part of a server-based system or network rather than a mobile system. Thus, system 1100, in the form of a server, may not have, or may not be directly connected to, the mobile elements such as the antenna, but may still have the same components of the speech recognition unit, and provide speech recognition services over a computer or telecommunications network for example. Likewise, platform 1202 of system 1200 may be a server platform instead. Using the disclosed speech recognition unit on server platforms will save energy and provide better performance.

Figure 12:
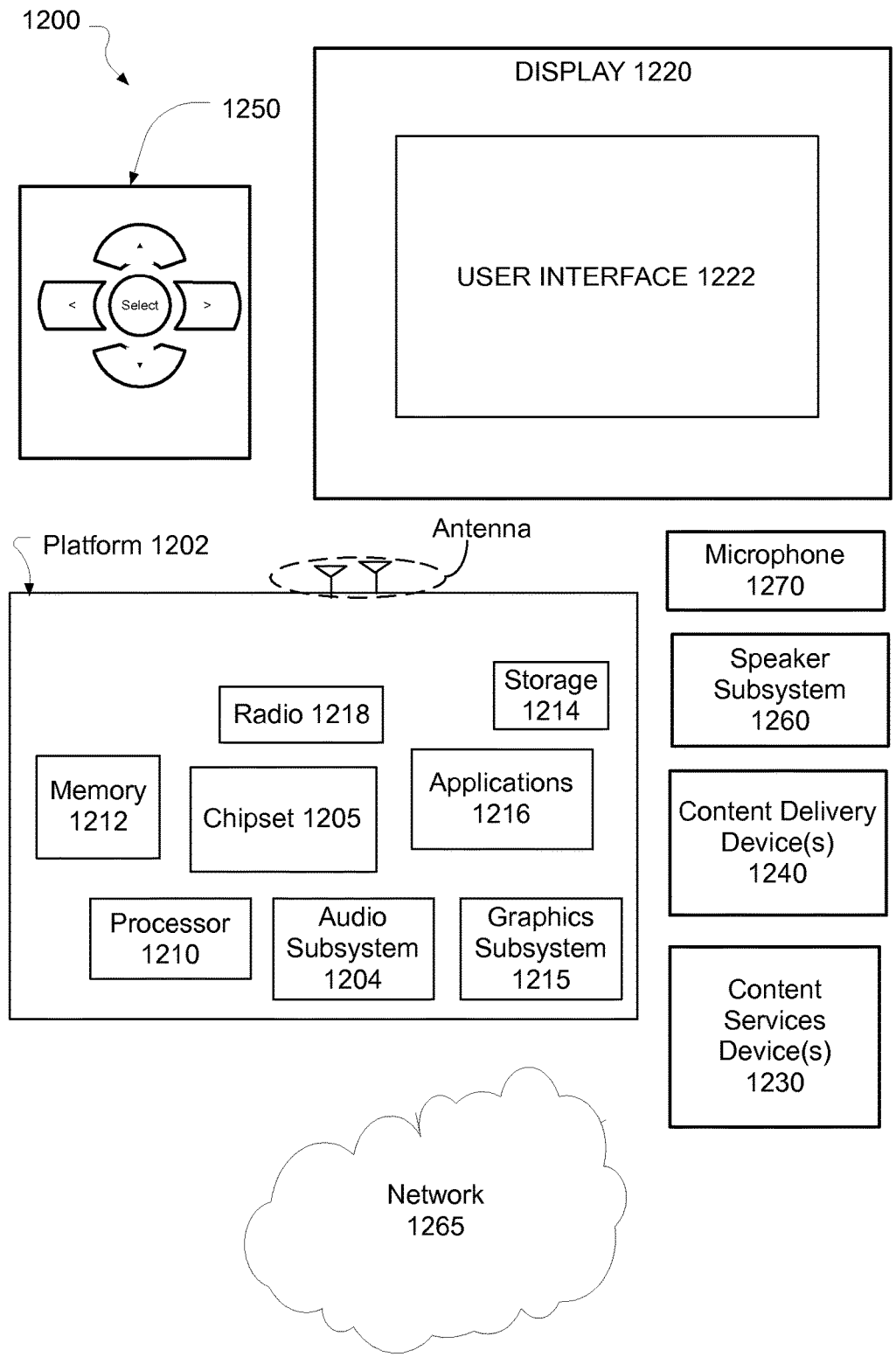
FIG. 12 is a diagram of another system.

Referring to FIG. 12, an example system 1200 in accordance with the present disclosure operates one or more aspects of the speech recognition system described herein. It will be understood from the nature of the system components described below that such components may be associated with, or used to operate, certain part or parts of the speech recognition system described above. In various implementations, system 1200 may be a media system although system 1200 is not limited to this context. For example, system 1200 may be incorporated into a microphone, personal computer (PC), laptop computer, ultralaptop computer, tablet, touch pad, portable computer, handheld computer, palmtop computer, personal digital assistant (PDA), cellular telephone, combination cellular telephone/PDA, television, smart device (e.g., smartphone, smart tablet or smart television or other wearable device such as a smart watch, smart glasses, or smart exercise wrist-band), mobile internet device (MID), messaging device, data communication device, and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202, speaker 1260, microphone 1270, and/or display 1220. Each of these components is described in greater detail below.

In various implementations, platform 1202 may include any combination of a chipset 1205, processor 1210, memory 1212, storage 1214, audio subsystem 1204, graphics subsystem 1215, applications 1216 and/or radio 1290. Chipset 1205 may provide intercommunication among processor 1210, memory 1212, storage 1214, audio subsystem 1204, graphics subsystem 1215, applications 1216 and/or radio 1290. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 and/or x64 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1210 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Audio subsystem 1204 may perform processing of audio such as acoustic signals for speech recognition as described herein and/or voice recognition. The audio subsystem 1204 may comprise one or more processing units and accelerators. Such an audio subsystem may be integrated into processor 1210 or chipset 1205. In some implementations, the audio subsystem 1204 may be a stand-alone card communicatively coupled to chipset 1205. An interface may be used to communicatively couple the audio subsystem 1204 to a speaker 1260, microphone 1270, and/or display 1220.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1290 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1290 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220, speaker 1260, and microphone 1270. Platform 1202 and/or content services device(s) 1230 may be coupled to a network 1265 to communicate (e.g., send and/or receive) media information to and from network 1265. Content delivery device(s) 1240 also may be coupled to platform 1202, speaker 1260, microphone 1270, and/or to display 1220.

In various implementations, content services device(s) 1230 may include a microphone, a cable television box, personal computer, network, telephone, Internet enabled devices or appliance capable of delivering digital information and/or content, and any other similar device capable of unidirectionally or bidirectionally communicating content between content providers and platform 1202 and speaker subsystem 1260, microphone 1270, and/or display 1220, via network 1265 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In implementations, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1204 also may be used to control the motion of articles or selection of commands on the interface 1222.

Movements of the navigation features of controller 1250 may be replicated on a display (e.g., display 1220) by movements of a pointer, cursor, focus ring, or other visual indicators displayed on the display or by audio commands. For example, under the control of software applications 1216, the navigation features located on navigation controller 1250 may be mapped to virtual navigation features displayed on user interface 1222, for example. In implementations, controller 1250 may not be a separate component but may be integrated into platform 1202, speaker subsystem 1260, microphone 1270, and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example, or by auditory command. Program logic may allow platform 1202 to stream content to media adaptors or other content services device(s) 1230 or content delivery device(s) 1240 even when the platform is turned "off." In addition, chipset 1205 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implementations, platform 1202, speaker 1260, microphone 1270, and/or display 1220 may be an integrated unit. Display 1220, speaker 1260, and/or microphone 1270 and content service device(s) 1230 may be integrated, or display 1220, speaker 1260, and/or microphone 1270 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
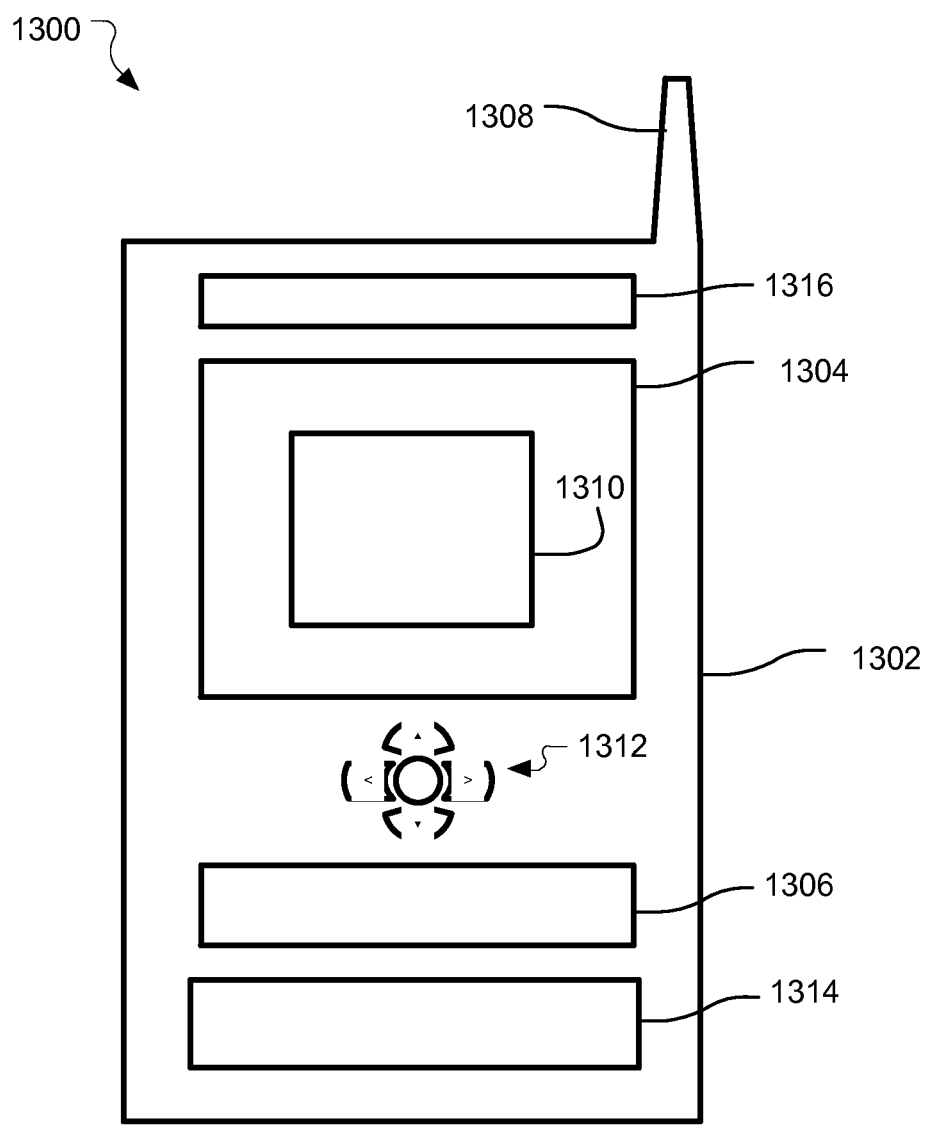
FIG. 13 illustrates another example device, all arranged in accordance with at least some implementations of the present disclosure.

Referring to FIG. 13, a small form factor device 1300 is one example of the varying physical styles or form factors in which system 1100 or 1200 may be embodied. By this approach, device 1300 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, and any other on-board (such as on a vehicle) computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 13, device 1300 may include a housing 1302, a display 1304 including a screen 1310, an input/output (I/O) device 1306, and an antenna 1308. Device 1300 also may include navigation features 1312. Display 1304 may include any suitable display unit for displaying information appropriate for a mobile computing device. I/O device 1306 may include any suitable I/O device for entering information into a mobile computing device. Examples for I/O device 1306 may include an alphanumeric keyboard, a numeric keypad, a touch pad, input keys, buttons, switches, rocker switches, software and so forth. Information also may be entered into device 1300 by way of microphone 1314. Such information may be digitized by a speech recognition device as described herein as well as voice recognition devices and as part of the device 1300, and may provide audio responses via a speaker 1316 or visual responses via screen 1310. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of decompressing transducer data for speech recognition comprises determining a location of a compressed block in an array of compressed blocks of transducer-related data; determining the compression rate of individual compressed entries in the located compressed block; determining a key value to be applied to individual compressed entries of the located compressed block to obtain the uncompressed value of the entry; reading a compressed entry from the compressed block; and decompressing the compressed entry by applying the key value to the compressed entry.

By another implementation, the method also may comprise that the individual compressed entries are numerical differences each being a difference between the key value and a transducer entry associated with one of the numerical differences; wherein the compressed entries associated with the block are associated with a list of transducer entries of the same parameter type; wherein the parameter type is at least one of an output label of an arc, an input label of an arc, arc destination state, arc source state, and a transition weight of an arc. The method also may comprise storing a plurality of the blocks formed from the list of transducer entries, wherein individual blocks each have a key value; storing the numerical differences forming the blocks in an order corresponding to the order of the transducer entries on the list; storing a zero numerical difference for the key value and in each block to maintain the order of the transducer entries from the list, wherein the compression rate of compressed entries is the same for the compressed entries in the same block; storing the key value and compression rate on a block-by-block basis in an array, wherein a plurality of the blocks are assigned the same number of compression entries; arranging transducer entries associated with the compressed entries into adjacency lists each associated with data of a different parameter type, and wherein the blocks are formed by assigning the numerical differences of transducer entries from the same list to the block; wherein the order of the transducer entries on the list corresponds to an index value associated with at least one adjacency list and corresponding to an arc or state location on the transducer;

obtaining an index value corresponding to an arc or state location on a transducer associated with the compressed entries; and determining the block location, compression rate, and key value depending, at least in part, on the index value; wherein the key value is the minimum uncompressed entry associated with a block; and wherein the uncompressed entry is obtained with four or less memory lookups.

By a computer-implemented method of compressing transducer data for speech recognition comprises obtaining transducer entries to be used to populate a transducer of states as nodes and arcs connecting the nodes to propagate at least one token through the transducer, wherein the transducer entries are to be assigned to the states or arcs; forming adjacency lists depending on parameter type wherein each list has an array of the uncompressed transducer entries of the same parameter type that is different from the parameter type of at least one other adjacency list; and storing a compressed value related to the transducer entry so that the transducer entry can be computed by using the value; and storing the value depending, at least in part, on the position of the transducer entry on one of the lists.

By yet another implementation, the method also may comprise that the transducer parameter type is one of: arc destination state, arc source state, arc input label, arc output label, and arc transition weight; wherein the compressed data is stored in one of a group of arrays wherein each array is related to a different transducer parameter type. The method comprises dividing the lists into blocks with the same number of transducer entries; forming a key transducer entry of each block, a numerical difference between the key transducer entry and transducer entries of the block as the value, and a number of bits of the binarized numerical differences in each block; reconstructing a transducer entry by using the transmitted data, the number of entries held in each block, and an index value associated with a location on the transducer that is associated with the transducer entry; and decompressing to obtain the transducer entry depending on, at least in part, the position of the transducer entry on one of the lists.

By yet another implementation, a computer-implemented system of speech recognition comprises at least one acoustic signal receiving unit, at least one processor communicatively connected to the acoustic signal receiving unit, at least one memory communicatively coupled to the at least one processor, and a transducer decoder operated by the processor and to: determine a location of a compressed block in an array of compressed blocks of transducer-related data; determine the compression rate of individual compressed entries in the located compressed block; determine a key value to be applied to individual compressed entries of the located compressed block to obtain the uncompressed value of the entry; read a compressed entry from the compressed block; and decompress the compressed entry by applying the key value to the compressed entry.

By another example, the system provides a transducer compression unit to wherein the individual compressed entries are numerical differences each being a difference between the key value and a transducer entry associated with one of the numerical differences; wherein the compressed entries associated with the block are associated with a list of transducer entries of the same parameter type; wherein the parameter type is at least one of an output label of an arc, an input label of an arc, arc destination state, arc source state, and a transition weight of an arc; the transducer decoder to: store a plurality of the blocks formed from the list of transducer entries, wherein individual blocks each have a key value; store the numerical differences forming the blocks in an order corresponding to the order of the transducer entries on the list; store a zero numerical difference for the key value and in each block to maintain the order of the transducer entries from the list, wherein the compression rate of compressed entries is the same for the compressed entries in the same block; store the key value and compression rate on a block-by-block basis in an array, wherein a plurality of the blocks are assigned the same number of compression entries; arrange transducer entries associated with the compressed entries into adjacency lists each associated with data of a different parameter type, and wherein the blocks are formed by assigning the numerical differences of transducer entries from the same list to the block, wherein the order of the transducer entries on the list corresponds to an index value associated with at least one adjacency list and corresponding to an arc or state location on the transducer; obtain an index value corresponding to an arc or state location on a transducer associated with the compressed entries; and determine the block location, compression rate, and key value depending, at least in part, on the index value; wherein the key value is the minimum uncompressed entry associated with a block; and wherein the uncompressed entry is obtained with four or less memory lookups.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of decompressing transducer data for automatic speech recognition, comprising:
providing one or more tokens associated with sounds or words associated with acoustic signal data and provided to a decoding transducer of an automatic speech recognition system;
decompressing the transducer data, by at least one processor of the automatic speech recognition system, to propagate the one or more tokens comprising:
determining a location of a compressed block in an array of compressed blocks of transducer-related data;
determining the compression rate of individual compressed entries in the located compressed block;
determining a key value to be applied to individual compressed entries of the located compressed block to obtain the uncompressed value of the entry;
reading a compressed entry from the compressed block; and
decompressing, the compressed entry by applying the key value to the compressed entry;

using, by the decoding transducer, the decompressed entry to propagate the one or more tokens through the transducer; and using, by the decoding transducer, the propagated tokens to form an utterance hypothesis.

2. The method of claim 1 wherein the individual compressed entries are numerical differences each being a difference between the key value and a transducer entry associated with one of the numerical differences.

3. The method of claim 1 wherein the compressed entries associated with the block are associated with a list of transducer entries of the same parameter type.

4. The method of claim 3 wherein the parameter type is at least one of an output label of an arc, an input label of an arc, arc destination state, arc source state, and a transition weight of an arc.

5. The method of claim 3 comprising storing a plurality of the blocks formed from the list of transducer entries, wherein individual blocks each have a key value.

6. The method of claim 5 comprising storing the numerical differences forming the blocks in an order corresponding to the order of the transducer entries on the list.

7. The method of claim 6 comprising storing a zero numerical difference for the key value and in each block to maintain the order of the transducer entries from the list.

8. The method of claim 1 wherein the compression rate of compressed entries is the same for the compressed entries in the same block.

9. The method of claim 1 comprising storing the key value and compression rate on a block-by-block basis in an array.

10. The method of claim 1 wherein a plurality of the blocks are assigned the same number of compression entries.

11. The method of claim 1 comprising arranging transducer entries associated with the compressed entries into adjacency lists each associated with data of a different parameter type, and wherein the blocks are formed by assigning the numerical differences of transducer entries from the same list to the block.

12. The method of claim 11 wherein the order of the transducer entries on the list corresponds to an index value associated with at least one adjacency list and corresponding to an arc or state location on the transducer.

13. The method of claim 1 comprising obtaining an index value corresponding to an arc or state location on a transducer associated with the compressed entries; and
determining the block location, compression rate, and key value depending, at least in part, on the index value.

14. The method of claim 1 wherein the key value is the minimum uncompressed entry associated with a block.

15. The method of claim 1 wherein the uncompressed entry is obtained with four or less memory lookups.

16. The method of claim 1 wherein the individual compressed entries are numerical differences each being a difference between the key value and a transducer entry associated with one of the numerical differences;
wherein the compressed entries associated with the block are associated with a list of transducer entries of the same parameter type;
wherein the parameter type is at least one of an output label of an arc, an input label of an arc, arc destination state, arc source state, and a transition weight of an arc;
the method comprising:
storing a plurality of the blocks formed from the list of transducer entries, wherein individual blocks each have a key value;
storing the numerical differences forming the blocks in an order corresponding to the order of the transducer entries on the list;
storing a zero numerical difference for the key value and in each block to maintain the order of the transducer entries from the list, wherein the compression rate of compressed entries is the same for the compressed entries in the same block;
storing the key value and compression rate on a block-by-block basis in an array, wherein a plurality of the blocks are assigned the same number of compression entries;
arranging transducer entries associated with the compressed entries into adjacency lists each associated with data of a different parameter type, and wherein the blocks are formed by assigning the numerical differences of transducer entries from the same list to the block, wherein the order of the transducer entries on the list corresponds to an index value associated with at least one adjacency list and corresponding to an arc or state location on the transducer;
obtaining an index value corresponding to an arc or state location on a transducer associated with the compressed entries; and
determining the block location, compression rate, and key value depending, at least in part, on the index value;
wherein the key value is the minimum uncompressed entry associated with a block; and
wherein the uncompressed entry is obtained with four or less memory lookups.

17. A computer-implemented method of compressing transducer data for automatic speech recognition, comprising:
obtaining, by at least one processor of an automatic speech recognition system, transducer entries to be used by a decoder of the automatic speech recognition system to populate a transducer of states as nodes and arcs connecting the nodes to propagate at least one token through the transducer and that is associated with a sound or word of an acoustic signal and in order to generate hypothesis utterances, wherein the transducer entries are to be assigned to the states or arcs;
forming, by at least one processor of an automatic speech recognition system, adjacency lists depending on a parameter type wherein each list has an array of the uncompressed transducer entries of the same parameter type that is different from the parameter type of at least one other adjacency list; and
storing, by at least one processor of an automatic speech recognition system, a compressed value related to the transducer entry so that the transducer entry can be computed by using the value, and storing the value depending, at least in part, on the position of the transducer entry on one of the lists.

18. The method of claim 17 wherein the transducer parameter type is one of: arc destination state, arc source state, arc input label, arc output label, and arc transition weight.

19. The method of claim 17 wherein the compressed data is stored in one of a group of arrays wherein each array is related to a different transducer parameter type.

20. The method of claim 17 comprising:
dividing the lists into blocks with the same number of transducer entries; and
forming a key transducer entry of each block, a numerical difference between the key transducer entry and transducer entries of the block as the value, and a number of bits of the binarized numerical differences in each block.

21. The method of claim 20 comprising reconstructing a transducer entry by using the transmitted data, the number of entries held in each block, and an index value associated with a location on the transducer that is associated with the transducer entry.

22. The method of claim 17 comprising decompressing to obtain the transducer entry depending on, at least in part, the position of the transducer entry on one of the lists.

23. The method of claim 17 wherein the transducer parameter type is one of: arc destination state, arc source state, arc input label, arc output label, and arc transition weight;
   wherein the compressed data is stored in one of a group of arrays wherein each array is related to a different transducer parameter type;
   the method comprising:
      dividing the lists into blocks with the same number of transducer entries; and
      forming a key transducer entry of each block, a numerical difference between the key transducer entry and transducer entries of the block as the value, and a number of bits of the binarized numerical differences in each block;
      reconstructing a transducer entry by using the transmitted data, the number of entries held in each block, and an index value associated with a location on the transducer that is associated with the transducer entry; and
      decompressing to obtain the transducer entry depending on, at least in part, the position of the transducer entry on one of the lists.

24. A computer-implemented system of speech recognition comprising:
   at least one acoustic signal receiving unit;
   at least one processor communicatively connected to the acoustic signal receiving unit;
   at least one temporary memory communicatively coupled to the at least one processor; and
   a transducer decoder operated by the at least one processor and arranged to:
      determine a location of a compressed block in an array of compressed blocks of transducer-related data;
      determine the compression rate of individual compressed entries in the located compressed block;
      determine a key value to be applied to individual compressed entries of the located compressed block to obtain the uncompressed value of the entry;
      read a compressed entry from the compressed block; and
      decompress the compressed entry by applying the key value to the compressed entry.

25. The system of claim 24 wherein the individual compressed entries are numerical differences each being a difference between the key value and a transducer entry associated with one of the numerical differences;
   wherein the compressed entries associated with the block are associated with a list of transducer entries of the same parameter type;
   wherein the parameter type is at least one of an output label of an arc, an input label of an arc, arc destination state, arc source state, and a transition weight of an arc;
   the transducer decoder to:
      store a plurality of the blocks formed from the list of transducer entries, wherein individual blocks each have a key value;
      store the numerical differences forming the blocks in an order corresponding to the order of the transducer entries on the list;
      store a zero numerical difference for the key value and in each block to maintain the order of the transducer entries from the list, wherein the compression rate of compressed entries is the same for the compressed entries in the same block;
      store the key value and compression rate on a block-by-block basis in an array, wherein a plurality of the blocks are assigned the same number of compression entries;
      arrange transducer entries associated with the compressed entries into adjacency lists each associated with data of a different parameter type, and wherein the blocks are formed by assigning the numerical differences of transducer entries from the same list to the block, wherein the order of the transducer entries on the list corresponds to an index value associated with at least one adjacency list and corresponding to an arc or state location on the transducer;
      obtain an index value corresponding to an arc or state location on a transducer associated with the compressed entries; and
      determine the block location, compression rate, and key value depending, at least in part, on the index value;
   wherein the key value is the minimum uncompressed entry associated with a block; and
   wherein the uncompressed entry is obtained with four or less memory lookups.

* * * * *